(12) United States Patent
Vilkhovyi et al.

(10) Patent No.: US 11,954,264 B2
(45) Date of Patent: Apr. 9, 2024

(54) CALIBRATION METHOD FOR AN ELECTRONIC DISPLAY SCREEN FOR TOUCHLESS GESTURE CONTROL

(71) Applicant: AMERIA AG, Heidelberg (DE)

(72) Inventors: Ihor Vilkhovyi, Dossenheim (DE); Martin Seiler, Ehrenkirchen (DE)

(73) Assignee: AMERIA AG, Heidelberg (DE)

( * ) Notice: Subject to any disclaimer, the term of this patent is extended or adjusted under 35 U.S.C. 154(b) by 22 days.

(21) Appl. No.: 17/945,375

(22) Filed: Sep. 15, 2022

(65) Prior Publication Data

US 2023/0325000 A1 Oct. 12, 2023

(30) Foreign Application Priority Data

Apr. 8, 2022 (EP) ..................................... 22167387

(51) Int. Cl.
*G06F 3/00* (2006.01)
*G06F 3/01* (2006.01)
(Continued)

(52) U.S. Cl.
CPC ........... *G06F 3/017* (2013.01); *G06K 7/1417* (2013.01); *G06T 7/73* (2017.01); *G06T 7/80* (2017.01);
(Continued)

(58) Field of Classification Search
CPC ........ G06F 3/017; G06F 3/0418; G06F 3/042; G06K 7/1417; G06T 2207/10028;
(Continued)

(56) References Cited

U.S. PATENT DOCUMENTS

| 2011/0050640 A1* | 3/2011 | Lundback | G06F 3/0488 345/175 |
| 2013/0234931 A1* | 9/2013 | Keranen | G06F 3/0428 29/592.1 |

(Continued)

FOREIGN PATENT DOCUMENTS

EP    2056185 A2    5/2009

OTHER PUBLICATIONS

International Search Report and Written Opinion issued in International Patent Application No. PCT/EP2023/059333 dated May 24, 2023.

(Continued)

*Primary Examiner* — Insa Sadio
(74) *Attorney, Agent, or Firm* — MARSHALL, GERSTEIN & BORUN LLP (57) ABSTRACT

A computer-implemented method of calibrating an electronic display screen for touchless gesture control using a calibration device, wherein the method comprises: displaying, by the electronic display screen, a calibration pattern; detecting, using at least one depth camera, a calibration device being placed on the electronic display screen and a reflection of at least a part of the calibration pattern, wherein the reflection is provided by a reflective surface of the calibration device; determining, based on the detected reflection, the position of the calibration device with respect to the displayed calibration pattern on the electronic display screen; defining a touchless gesture control input area for the electronic display screen being observable by the at least one depth camera.

20 Claims, 7 Drawing Sheets

(51) Int. Cl.
   *G06K 7/14*    (2006.01)
   *G06T 7/73*    (2017.01)
   *G06T 7/80*    (2017.01)

(52) U.S. Cl.
   CPC ............... *G06T 2207/10028* (2013.01); *G06T 2207/30204* (2013.01)

(58) Field of Classification Search
   CPC ... G06T 2207/30204; G06T 7/73; G06T 7/80; G06V 10/19
   See application file for complete search history.

(56) References Cited

U.S. PATENT DOCUMENTS

2014/0002417 A1    1/2014   Yoshida
2014/0313122 A1   10/2014   Tang et al.

OTHER PUBLICATIONS

Extended European Search Report issued in European Application No. 22167387.4 dated Oct. 16, 2022.

* cited by examiner

CALIBRATION METHOD FOR AN ELECTRONIC DISPLAY SCREEN FOR TOUCHLESS GESTURE CONTROL

This application claims priority to European Patent Office (EPO) application EP22167387 (filed Apr. 8, 2022) entitled "Calibration Method for an Electronic Display Screen for Touchless Gesture Control," the entire disclosure of which is incorporated herein by reference.

TECHNICAL FIELD

The present invention generally relates to calibration techniques for touchless gesture control, and more particularly to a method of calibrating an electronic display screen for touchless gesture control. Further, the present invention relates to a calibration device for use in an aforementioned method.

BACKGROUND

Electronic display devices have nowadays become omnipresent in various areas of modern life. Examples include electronic display screens in public places which provide useful information to the user, e. g. in shopping malls, trade shows, train stations, airports, and the like, a field which is commonly termed "digital signage". One form of such electronic display screens are touchscreens that provide interactive functions to allow users to interact with the information, e. g. by selecting control elements such as buttons, selecting items from a list, controlling a cursor, and the like. Such public touchscreens are nowadays used e.g. in ticketing machines, check-out systems in supermarkets or restaurants, interactive signposts, and the like.

However, not least because of the recent COVID-19 pandemic, users have become hesitant to use touchscreens in public places because of health concerns. This has created a desire to provide input capabilities, in particular gesture control, without having to physically touch the display. Some commercial products have already addressed this desire, for example:

The touchless air gesture technology of Gestoos (https://gestoos.com/) aims at transforming touchscreens or digital displays into a touch-free experience. The Gestoos technology uses a depth sensor to allow the user to control the mouse cursor of the operating system, mapping the finger coordinates to its screen position, while the fingers stay at a distance from the screen.

GLAMOS (https://www.kickstarter.com/projects/300948436/glamos-bring-your-touchless-screens-to-life), sets out to use lidar technology to turn screens into interactive touch screens.

AIRxTOUCH (https://www.airxtouch.com/) provides an all-in-one touchless interactive kiosk. Depth sensors detect the user's finger before it touches the display and generates click events. The related international patent application WO 2015/139969 provides technological background.

Touchjet (https://www.touchjet.com/wave-lily/) aims at turning flat screen TVs into a tablet for collaboration and interactive presentations using a digital pen.

Ultraleap (https://developer.leapmotion.com/touchfree/) provides leapmotion, which is a small device (infraread camera) with relatively small range for hand tracking and hand gesture recognition. The system uses a single camera, so that the hand recognition precision is limited and decreases the bigger the screen is.

However, the known technologies either provide complete all-in-one hardware solutions to replace existing displays, provide only limited hand recognition precision or they require a cumbersome calibration of sensors that are added to an existing display to reliably detect gestures. What is needed is an easier way of retrofitting existing touchscreens or electronic display screens to provide touchless control capabilities that is easy to set up.

It is therefore the technical problem underlying the present invention to provide an improved calibration method for calibrating an electronic display screen for touchless gesture control, thereby at least partly overcoming the disadvantages of the prior art.

SUMMARY

The problem is solved by the subject-matter defined in the independent claims. Advantageous modifications of embodiments of the invention are defined in the dependent claims as well as in the description and the figures.

According to a first aspect of the present invention, a computer-implemented method of calibrating an electronic display screen for touchless gesture control using a calibration device is provided. The method may comprise displaying, by the electronic display screen, a calibration pattern. The method may comprise detecting, using at least one depth camera, a calibration device being placed on the electronic display screen and a reflection of at least a part of the calibration pattern, wherein the reflection may be provided by a reflective surface of the calibration device. The method may comprise determining, based on the detected reflection, the position of the calibration device with respect to the displayed calibration pattern on the electronic display screen. The method may comprise defining a touchless gesture control input area for the electronic display screen being observable by the at least one depth camera.

The term electronic display screen may include any type of display that is powered by electrical energy. In particular, it includes all types of LCD screens, LED screens, touch screens, e-ink screens and the like. The size and shape of the screens may vary.

The term touchless gesture control encompasses the control of content, control elements, display elements, information offers and setting parameters through user gestures. In particular, it includes any kind of interaction of a user with the electronic display screen that is based on movements of a user's extremities, in particular a user's arm, hand or finger(s). Examples of such movement include, in particular, click movements and swipe movements that can be performed with the hand and/or fingers of a user. As another example, handshape-based gestures may be included, particularly the clenching of a fist or the spreading of fingers.

The term calibration device includes any type of suitable equipment that enables the calibration method to be carried out. Examples of such calibration devices can be found in the second aspect of the present invention.

The term depth camera may encompass any type of camera device capable of generating depth information. Various techniques may be used in such depth cameras, for example time-of-flight, interferometry, stereo systems, triangulation, and the like. Certain types of depth cameras may include means for generating a color image, such as an RGB image, and means for generating a depth image, such as an infrared image. Such means may include an RGB camera, an infrared projector and an infrared sensor. Other types of depth cameras may include stereoscopic camera devices, such as devices with two image sensors. Some stereoscopic cameras may include two color image producing means, such as two RGB cameras in a predefined distance based on which the depth information may be derived by triangulation. The at least one depth camera may for example be an Intel RealSense depth camera.

The at least one depth camera may be placed at or near an upper edge of the electronic display screen and/or at or near a lower edge of the electronic display screen. For example, if the electronic display screen comprises a framing, the at least one depth camera may be mounted at this framing. Generally speaking, one condition, preferably the only condition, for the camera position is that it can capture the entire surface of the calibration device and that the entire calibration device reflects the screen content.

The detected calibration pattern of the calibration device may be any type of machine-readable pattern, preferably including at least one fiducial marker. Examples for a suitable calibration pattern are AprilTags and/or QR-Codes, or a combination of a plurality of AprilTags and/or QR-Codes. Generally speaking, the calibration patterns is preferably unique in a certain region, the size of which is defined primarily by the size of the calibration device and its post with respect to the camera. An example of a calibration pattern is a de Bruijn torus which is unique in a 4×4 neighborhood.

In general, the calibration according to the first aspect of the present invention may be performed locally on the electronic display screen, for example using a processor of the electronic display screen, or may be performed remotely on a server with which the electronic display screen may communicate, preferably at runtime. The server may be a cloud-based calibration platform.

The term "position of the calibration device with respect to the displayed calibration pattern on the electronic display screen" may be understood as the position of the calibration device when it is placed on the screen-surface of the electronic display screen, i.e., being in contact with the screen-surface of the electronic display screen. In that sense, the preposition "with respect to" may be replaced by "relative to" or "within" or "on the screen-surface". For example, a user may put the calibration device approximately in the middle of the electronic display screen. In that sense, the position may include a location of the calibration device when placed on the electronic display screen and preferably also an orientation of the calibration device. Ultimately, certain aspects of the invention aim at estimating the pose of the screen center, which may be done based on an estimation of the calibration device surface as well, although this information may later be discarded.

The term orientation may include, in particular, a rotation of the calibration device about a plane-normal of the electronic display screen. Further, the term orientation may include a tilting of the calibration device with respect to the plane-normal of the electronic display screen.

The reflective surface of the calibration device may for example be a mirror. In particular, a second surface mirror may be used as a reflective surface. In a preferred embodiment, the reflective surface of the calibration device is a first surface mirror.

Conventional mirrors that are widely used for everyday purposes have a protective surface of glass and have a mirror coating, commonly referred to as "silvering", on the back side, or "second surface". The exposed glass helps protect the mirror coating underneath from scratching or degradation due to environmental factors such as weather, fingerprints, and dust. In high precision applications, second surface mirrors have some disadvantages. Light traveling through the glass to strike the reflective material on the backside or second surface creates a refracted or bent image as well as a dimming and distortion of the reflection. In order to provide a clear reflection without distortion of the reflection, a front or first surface mirror may be used. The mirror has the reflective surface, i.e. mirror coating, on the exposed front surface of the glass which faces incident light. The mirror coating may be an enhanced aluminum, protected gold, or silver. The light reflects directly off the mirror coating without passing through the glass substrate, thus increasing the quality and intensity of the reflection. While a second surface mirror will typically reflect around 80 to 85% of the incoming light, a first surface mirror typically reflects 94 to 99%.

The term input area of the electronic display screen refers in general to the screen layer of the electronic display screen on which content may be displayed during an interaction of a user and with which a user may interact. For enabling gesture input, the input area may include or be equal to a virtual screen layer which is defined to extend distanced by a predetermined distance parallel to the electronic display screen. In other words, the input area may be a spatial area which is e.g. parallel to the screen layer and which is observed by the at least one depth camera to recognize gesture inputs of users. Thus, it may be provided that determining a touchless gesture control input area comprises a definition of a virtual screen layer being essentially parallel to the electronic display screen, preferably at a distance d and/or a definition of the dimensions of the electronic display screen and/or a definition of a coordinate system, preferably a cartesian coordinate system with an x-axis and a y-axis, each being parallel to the electronic display screen, and a z-axis being orthogonal to the electronic display screen.

The method may further comprise the definition of setup-parameters associated with the input area. Preferably, the setup-parameters include the definition of the input area. Further, the setup-parameters may include predefined gestures, gesture velocities and/or other parameters associated with the functionality of the electronic display screen with respect to user interaction. It is particularly preferred if the setup-parameters include a tolerance range with respect to the input area which allows to compensate slight calibration inaccuracies, so that the user experience during user interaction is not adversely affected.

The proposed method according to the present invention is particularly advantageous as it allows a simple and at the same time precise calibration of electronic display screens of any kind. In particular, only a few steps are required since the calibration device only has to be placed once. Further, not specific calibration pattern of the calibration device is needed because the calibration pattern is provided by the electronic display screen itself.

Thus, the calibration can be completed in a short time. It is beneficially possible to equip also already existing electronic display screens, for example with touchscreens or non-touchscreens, which may have been in use for years, with a gesture control option. For example, depth cameras can be mounted on an existing electronic display screen and the corresponding software can be executed for calibration.

It may be provided that the calibration pattern consists of adjacent pattern sections, wherein respective adjacent pattern sections are distinguishable from each other, and preferably wherein each pattern section of the calibration pattern is unique.

While reflecting at least a part of the displayed calibration pattern, respective one or more sections or adjacent sections may be reflected. If the pattern sections are distinguishable from each other, preferably uniquely, the position of the calibration device with respect to the displayed calibration pattern can be obtained.

Further, a digital representation of the calibration pattern may be preserved, preferably in a data storage of the electronic display screen or in a data storage of a server. The digital representation may be a virtual copy of the displayed calibration pattern. In other words, the digital representation may be a replica of the actual calibration pattern. If the reflection of the calibration device is detected, the reflection may be compared to the digital representation of the displayed calibration pattern. Based on the uniqueness of the sections of the calibration pattern, the location within the pattern, i.e., on the screen-surface, can be calculated. Based on a degree of distortion and/or displacement of the reflection, the orientation of the calibration device and/or the plane of the reflective surface can be calculated by comparison with the digital representation. Alternatively or additionally, the orientation of the calibration device may be determined using a reference marking of the calibration device, the reference marking preferably being provided at corners and/or edges of the reflective surface.

In other words, any misalignment of the reflection in comparison with the digital representation may be used to determine the position of the calibration device including its location and/or orientation with respect to the electronic display screen.

The method may comprise, prior to defining the touchless gesture control input area, determining borders of the electronic display screen based at least on the detected reflection, a digital representation of the calibration pattern being preserved in a data storage, and a screen dimension information with respect to the electronic display screen.

The data storage may be provided locally at the electronic display screen, or remotely on a server. The digital representation may thus be stored on a memory of the electronic display screen or on a in server with which the electronic display screen may communicate. In case if the reference pattern is stored on a server, the reference pattern may be preserved to the electronic display screen at runtime. Any calculation may accordingly be performed locally and/or on a server.

The term screen dimension information may include any information of set of information which allows to derive the size of the screen, in particular of the screen layer of the electronic display screen. Further, the screen dimension information may include information which allows to derive the shape of the electronic display screen, for example being rectangular of squared.

The term border of the electronic display screen may be understood to mean the edge of the screen layer onto which gesture input is intended to be recognized. In particular, if the electronic display screen comprises a framing, the border may refer to the inner edge of the framing.

It may be provided that the screen dimension information with respect to the electronic display screen is received via user input and/or is determined automatically based on a resolution of the electronic display screen and based on a pixel density electronic display screen.

It may be provided that the screen dimension information with respect to the electronic display screen is received via user input. Alternatively or additionally, the screen dimension information may be determined automatically based on a resolution of the electronic display screen and based on a pixel density of the electronic display screen.

Many operating systems inherently preserve the resolution and the pixel density of a respective display screen. Thus, it is particularly beneficial and convenient to use this information for determining the size of the electronic display screen for determining the borders of the electronic display screen. For this purpose, a simple multiplication of the resolution and the pixel density may be performed.

The resolution of a display screen is the number of distinct pixels in each dimension that can be displayed. It is usually quoted as width x height, with the unit "pixels". For example, a resolution of 1024×768 means the width is 1024 pixels and the height is 768 pixels.

The pixel density of a display screen is regularly specified in the unit "pixels per inch" (ppi) and/or "pixels per centimeter" (ppcm or pixels/cm). For example, the pixel density of computer monitors, television displays or image digitizing device such as a cameras or image scanners, is regularly given in ppi. Horizontal and vertical pixel density are usually the same, as most devices have square pixels. Other than the resolution, the pixel density describes the amount of detail on a physical surface or device, wherein the resolution describes the amount of pixel information regardless of its scale.

To increase the robustness against errors, a user input can be used additionally. For example, the user can measure the width and height of the electronic display screen and enter it in a suitable unit of measurement, such as cm. If the resolution and/or the pixel density are not available, only a user input can also be used.

It may be provided that the calibration pattern is a fiducial marker, preferably an AprilTag and/or a QR-Code.

The method may comprise detecting, using the at least one depth camera, a reference marking of the calibration device, the reference marking preferably being provided at corners and/or edges of the reflective surface.

As described above, on the one hand, the location within the displayed calibration pattern, i.e. on the screen-surface, can be calculated based on the uniqueness of the sections of the calibration pattern. On the other hand, the orientation of the calibration device may be determined based on a degree of distortion and/or displacement of the reflection. For the determination of the orientation, it is an alternative easier way to use a reference marking of the calibration device. The reference marking may be a simple pattern in the shape of a frame being provided at corners and/or edges of the reflective surface. If the calibration device is misaligned, the reference marking as it is detected by the depth cameras, is distorted and/or displaced which allows to derive the orientation of the calibration device with respect to the electronic display screen.

The method may further comprise displaying a calibration guiding mark on the electronic display screen, preferably in or near the center of the electronic display screen, for guiding a user to place the calibration device in a predetermined calibration position. The calibration position may include a predetermined position of the calibration device on the electronic display screen and preferably also a predetermined orientation of the calibration device with respect to the electronic display screen.

Using a calibration guiding mark provides an easy and efficient support for a user calibrating an electronic display screen. Further, the quality of a calibration process may be enhanced by providing a calibration guiding mark through unequivocally guiding a user to a particular positioning of a calibration device on the electronic display screen, including placing the calibration device on the electronic display screen in a specific rotational orientation with respect to a plane-normal of the electronic display screen. In other words: Using at least one calibration guiding mark makes it easy for a user to find a suitable position and/or orientation of a calibration device on the electronic display screen, thus increasing the risk of a wrong calibration. The calibration guiding mark can be provided in particular as a visually highlighted area, for example by a colored underlay of a section of the calibration pattern, which does not interfere with the appearance and detectability of the reflection.

It may be provided that at least the steps of detecting the calibration device—i.e. the reflection—, determining the position of the calibration device, and defining the touchless gesture control input area are triggered upon receiving a user input or upon automatically detecting that the calibration device positioned on the electronic display screen, wherein detecting that the calibration device is positioned on the electronic display screen preferably includes detecting a calibration triggering mark of the calibration device. The calibration triggering mark may be an acoustic mark and/or visual mark. In particular the calibration detection mark may be the same as the reference marking as described above. With respect to the technical implementation and benefits of this particular feature, it is referred to the description of the second aspect of the present invention.

It may be provided that determining borders of the electronic display screen comprises at least one base transformation operation of a coordinate system.

It may be provided that determining borders of the electronic display screen comprises determining, using the at least one depth camera, a center of the reflected part of the calibration pattern in 3D and defining a coordinate system, wherein the center of the reflected part of the calibration pattern is the origin of the coordinate system, and shifting the origin of the coordinate system orthogonal to the screen surface of the electronic display screen so that the origin of the coordinate system is in the plane of the screen surface of the electronic display screen.

It may be provided that detecting the calibration device and/or reflection is performed using two depth cameras. The two depth cameras may be arranged at borders of the electronic display screen. Preferably, the two depth cameras are arranged at opposing borders of the electronic display screen, for example one being mounted at an upper border and one being mounted at a lower border of the electronic display screen such that both of the depth cameras are able to observe a spatial area which is e.g. parallel to the screen layer.

In this embodiment, a calibration device may be used having a double-sided reflective surface or two reflective surfaces, i.e. reflecting at least one part of the displayed calibration pattern towards each depth camera. The calibration device may be placed on the electronic display screen, whereby a first reflective surface at a first side of the calibration device may face a first depth camera, e.g. the depth camera which is mounted at the upper border of the electronic display screen, and whereby a second reflective surface at a second side of the calibration device may face a second depth camera, e.g. the depth camera which is mounted at the lower border of the electronic display screen. Both depth cameras may detect the respective reflection. The reflections are preferably of the same shape. The calibration with respect to the first and with respect to the second depth camera may be performed sequentially or at the same time.

It may be provided that determining a touchless gesture control input area comprises a definition of a virtual screen layer being essentially parallel to the electronic display screen, preferably at a distance d. The virtual screen layer may be a coordinate system, preferably a cartesian coordinate system with a x-axis and a y-axis, each being parallel to the electronic display screen, and a z-axis being orthogonal to the electronic display screen surface.

Touchless gestures for controlling the interface of the electronic display screen may in particular include the control of content, control elements, display elements, information offers and setting parameters through user gestures. In particular, it may include any kind of interaction of a user with the electronic display screen that is based on movements of a user's extremities, in particular a user's arm, hand or finger(s). Examples of such movement include, in particular, click movements and swipe movements that can be performed with the hand and/or fingers of a user. As another example, handshape-based gestures may be included, particularly the clenching of a fist or the spreading of fingers.

The method may comprise outputting a signal upon starting, successfully ending, aborting, and/or failing the calibration of the electronic display screen.

According to a second aspect of the present invention, a calibration device for calibration an electronic display screen is provided. The calibration device may be configured for use in a method according to the first aspect of the present invention. The calibration device may comprise a footing section for placing the calibration device on the electronic display screen. The calibration device may comprise at least one mirror holding section. The mirror holding section may hold a reflective surface, for example a mirror, at a predetermined angle with respect to the electronic display screen when the calibration device is positioned on the electronic display screen. The reflective surface may preferably be a first surface mirror. At least one reference marking may be provided on the reflective surface and/or the mirror holding section and/or the footing section.

All technical implementation details and advantages described with respect to the first aspect of the present invention are self-evidently mutatis mutandis applicable for the second aspect of the present invention.

The footing section may for example be formed as a rectangular or squared frame. This shape allows a view onto the electronic display screen and thus onto a calibration pattern that may be displayed on the electronic display screen. If the electronic display screen displays, in addition to the calibration pattern, a calibration guiding mark, as described above, the user can easily find the respective calibration position by being able to see the electronic display screen through the frame.

The footing section may also be configured so that it does not cause damage to the electronic display screen when the calibration device is placed on its surface. For example, the footing section may be made of a display-friendly material, have a coating of a display-friendly material, have attached elements of a display-friendly material. The display-friendly material can in particular be or include rubber and/or felt.

There may be a rigid connection between the footing section and the mirror holding section, defining an angle between the footing section and the mirror holding section. This angle may be such that when the calibration device is placed on the electronic display screen, there is a predefined angle, for example 45 degrees, between the mirror and the electronic display screen. The angle between the footing section and the mirror holding section may be approximately 135 degrees, for example.

Alternatively, a hinge can be provided between the footing section and the mirror holding section, which allows the angle between the footing section and the mirror holding section to be adjusted.

In a calibration according to the first aspect of the present invention, an angle of 45 degrees between the mirror and the surface of the electronic display screen is preferred, since at this angle the reflected section of the calibration pattern is largest and/or least distorted.

Conventional mirrors that are widely used for everyday purposes have a protective surface of glass and have a mirror coating, commonly referred to as "silvering", on the back side, or "second surface". The exposed glass helps protect the mirror coating underneath from scratching or degradation due to environmental factors such as weather, fingerprints, and dust. In high precision applications, second surface mirrors have some disadvantages. Light traveling through the glass to strike the reflective material on the backside or second surface creates a refracted or bent image as well as a dimming and distortion of the reflection. In order to provide a clear reflection without distortion of the reflection, a front or first surface mirror may be used. The mirror has the reflective surface, i.e. mirror coating, on the exposed front surface of the glass which faces incident light. The mirror coating may be an enhanced aluminum, protected gold, or silver. The light reflects directly off the mirror coating without passing through the glass substrate, thus increasing the quality and intensity of the reflection. While a second surface mirror will typically reflect around 80 to 85% of the incoming light, a first surface mirror typically reflects 94 to 99%.

The reference marking may preferably be provided at corners and/or edges of the mirror, in particular on the mirror holding section. As described above, on the one hand, the location within the displayed calibration pattern, i.e. on the screen-surface, can be calculated based on the uniqueness of the sections of the calibration pattern. On the other hand, the orientation of the calibration device may be determined based on a degree of distortion and/or displacement of the reflection. For the determination of the orientation, it is an alternative easier way to use a reference marking of the calibration device. The reference marking may be a simple pattern in the shape of a frame being provided at corners and/or edges of the reflective surface. If the calibration device is misaligned, the reference marking as it is detected by the depth cameras, is distorted and/or displaced which allows to derive the orientation of the calibration device with respect to the electronic display screen.

14 According to a third aspect of the present invention, a data processing apparatus, preferably an electronic display screen, is provided which comprises means for carrying out the method according to the first aspect of the present invention.

According to a fourth aspect of the present invention, a kit-of-parts is provided, comprising a calibration device according to the second aspect of the present invention, and at least one depth camera for carrying out a calibration method according to the first aspect of the present invention.

15 According to a fifth aspect of the present invention, a computer program is provided comprising instructions which, when the program is executed by a computer, cause the computer to carry out the method according to the first aspect of the present invention.

All technical implementation details and advantages described with respect to the first aspect of the present invention are self-evidently mutatis mutandis applicable for the second aspect of the present invention. All technical implementation details and advantages described with respect to the second aspect of the present invention are self-evidently mutatis mutandis applicable for the first aspect of the present invention. All technical implementation details and advantages described with respect to the first and second aspects of the present invention, are self-evidently mutatis mutandis applicable for the third, fourth and fifth aspects of the present invention.

BRIEF DESCRIPTION OF THE DRAWINGS

The disclosure may be better understood by reference to the following drawings.

DESCRIPTION OF PREFERRED EMBODIMENTS

Figure 1:
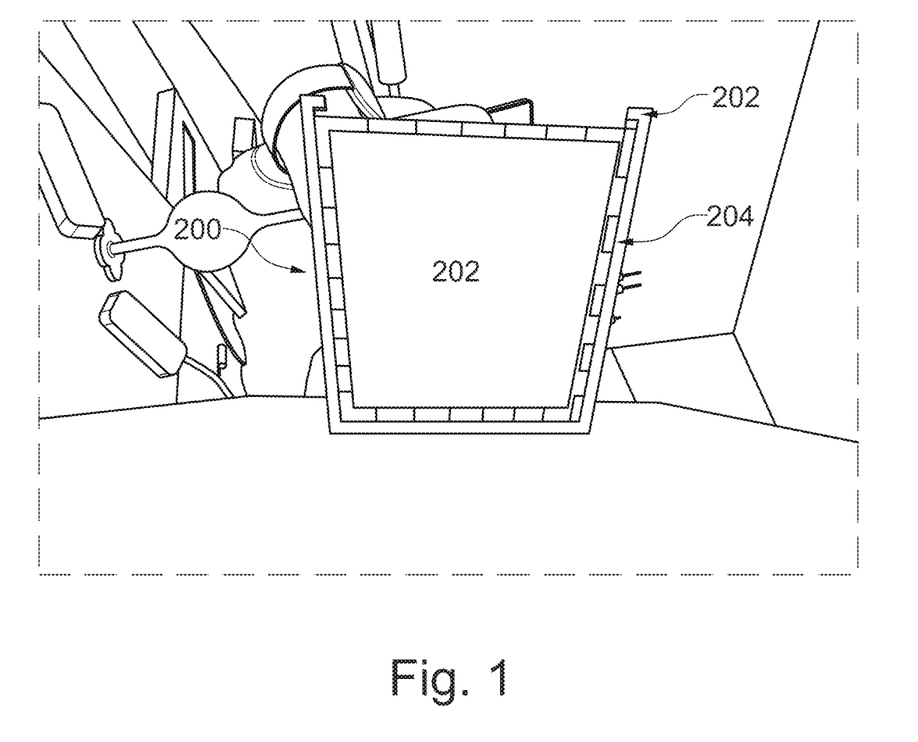
FIG. 1: A first photo of a calibration device according to embodiments of the present invention.

FIG. 1 is a first photo of a calibration device 200 according to embodiments of the present invention. As it can be seen from the photo, the calibration device 200 is placed on the surface of an electronic display screen 100, the electronic display screen being turned off.

The calibration device 200 comprises a mirror holding section 202 including a reference marking 204. The mirror holding section 202 holds a reflective surface, in particular a mirror.

Figure 2:
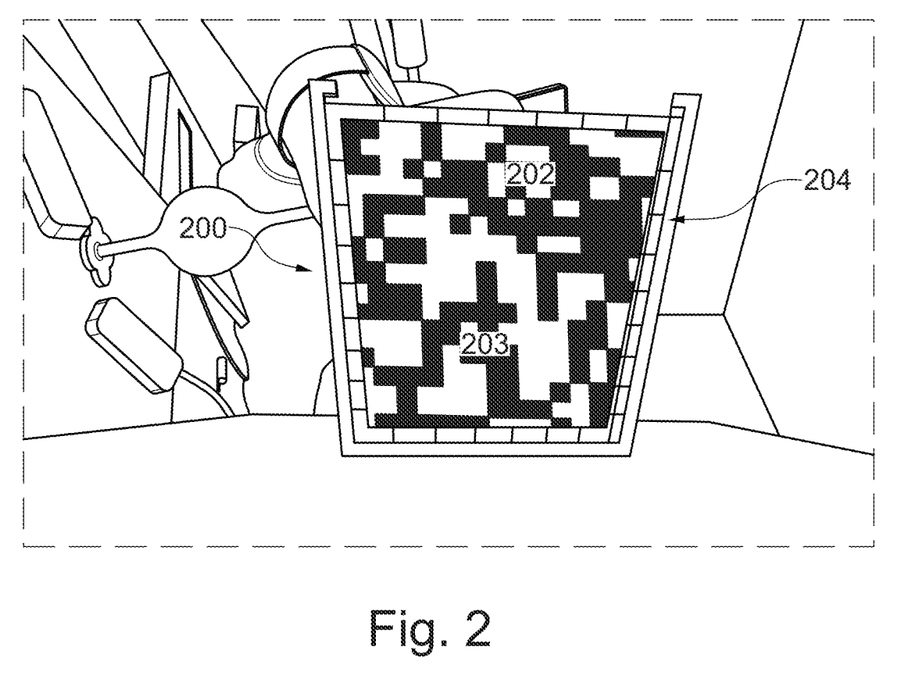
FIG. 2: A second photo of a calibration device according to embodiments of the present invention.

FIG. 2 is a second photo of a calibration device 200 according to embodiments of the present invention. As it can be seen from the photo, the calibration device 200 is placed on the surface of an electronic display screen 100, the electronic display screen being turned on during a calibration process. The electronic display screen 100 displays a calibration pattern 102 which is reflected as a reflection 203 by the mirror.

Figure 3:
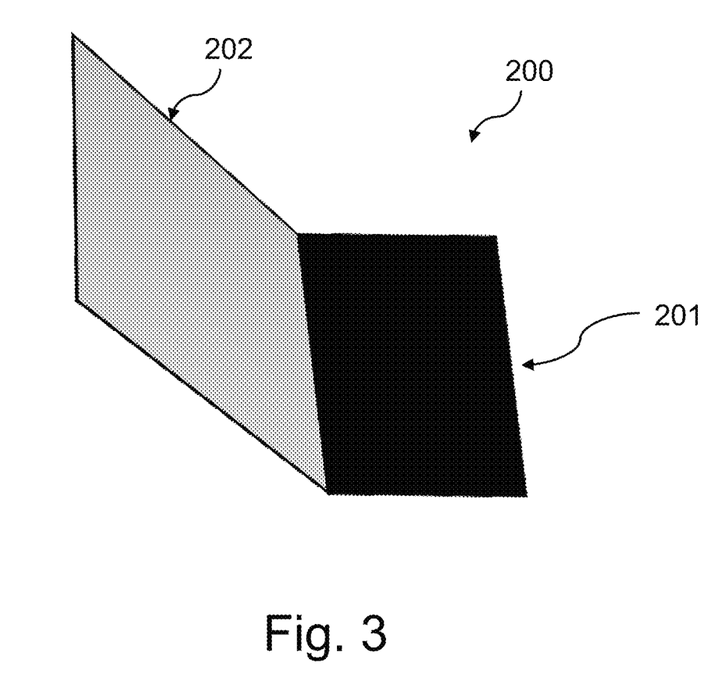
FIG. 3: A schematic illustration of a calibration device according to embodiments of the present invention.

FIG. 3 is a schematic illustration of a calibration device 200 according to embodiments of the present invention. The calibration device 200 comprises a footing section 201 and a mirror holding section 202. A rigid connection may be provided between the footing section 201 and the mirror holding section 202, defining an angle between the footing section 201 and the mirror holding section 202. The angle may for example be approximately 135 degrees as described above, thus causing an angle of approximately 45 degrees between the mirror holding section 202 and the electronic display screen 100 when the calibration device 200 is played on the electronic display screen 100. Alternatively, a hinge can be provided between the footing section 201 and the mirror holding section 202. This beneficially allows an adjustment of the angle between the footing section 201 and the mirror holding section 202 and thus of the angle between the mirror holding section 202 and the electronic display screen 100 when the calibration device 200 is played on the electronic display screen 100. In a calibration, an angle of 45 degrees between the mirror holding section 202, i.e. the mirror, and the surface of the electronic display screen 100 is preferred, since at this angle the reflected section of the calibration pattern is largest and/or least distorted.

Figure 4:
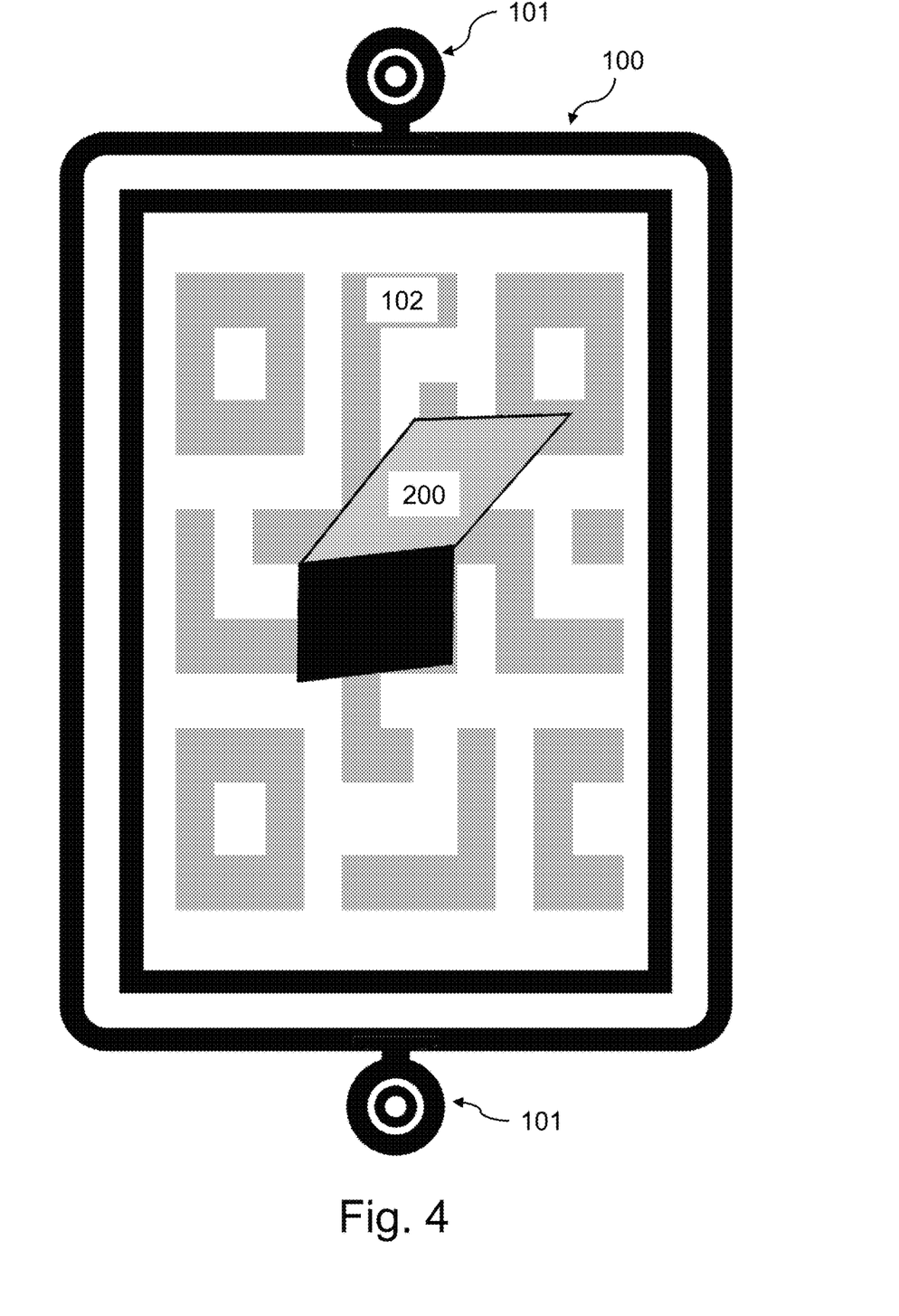
FIG. 4: A schematic illustration of an electronic display screen during a calibration process according to embodiments of the present invention.

FIG. 4 schematically illustrates an electronic display screen 100 and a calibration device 200 during a calibration process according to embodiments of the present invention. The electronic display screen 100 is equipped with two depth cameras 101. One depth camera 101 is mounted at an upper edge of the electronic display screen 100 and another depth camera 101 is mounted at a lower edge of the electronic display screen 100. The electronic display screen 100 displays a calibration pattern 102. The calibration device 200 ins placed on the electronic display screen 100 such that the reflective surface, i.e. the mirror, essentially faces one depth camera 101 and reflects a part of the calibration pattern 102 as a reflection 203 towards the respective depth camera 101. The calibration process may be carried out as described above. In order to increase the quality of the calibration, a second calibration may be carried out, wherein for the second calibration the calibration device 200 is placed on the electronic display screen 100 such that the reflective surface, i.e. mirror, essentially faced the other depth camera 101 (not shown).

Figure 5:
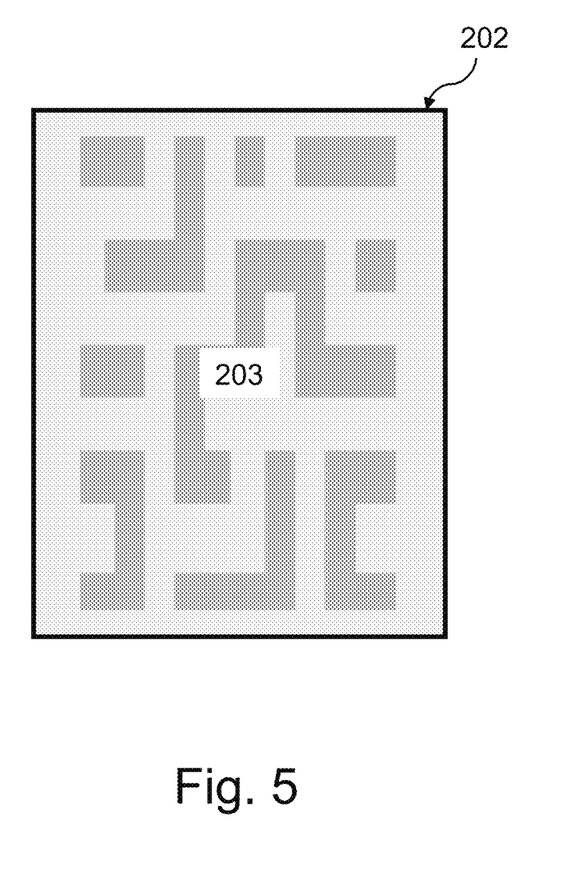
FIG. 5: A schematic illustration of a reflective surface of a calibration device during a calibration process according to embodiments of the present invention.

FIG. 5 is a schematic illustration of the mirror holding section 202 including the reflective surface, i.e. mirror, of the calibration device 200 during a calibration process. The reflection 203 is a part of the calibration pattern 102 which is displayed by a respective electronic display screen 100 intended to be calibrated.

Figure 6:
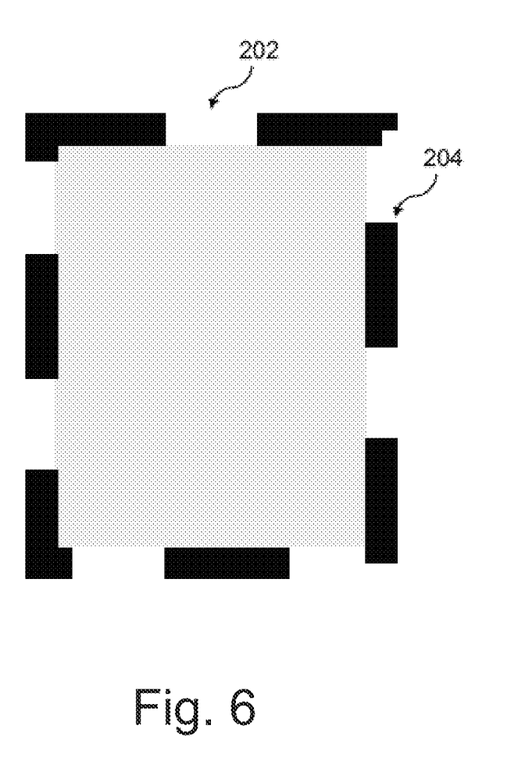
FIG. 6: A schematic illustration of a mirror holding section of a calibration device including a mirror and a reference marking according to embodiments of the present invention.

FIG. 6 is a schematic illustration of the mirror holding section 202 including the reflective surface, i.e. mirror, of the calibration device 200. In this embodiment, a reference marking 204 is provided at the mirror holding section 202. Through the reference marking 204, the orientation of the calibration device 200 may be determined. Any misalignment of the calibration device 200 may thus be determined and considered for calibration, as described above.

Figure 7:
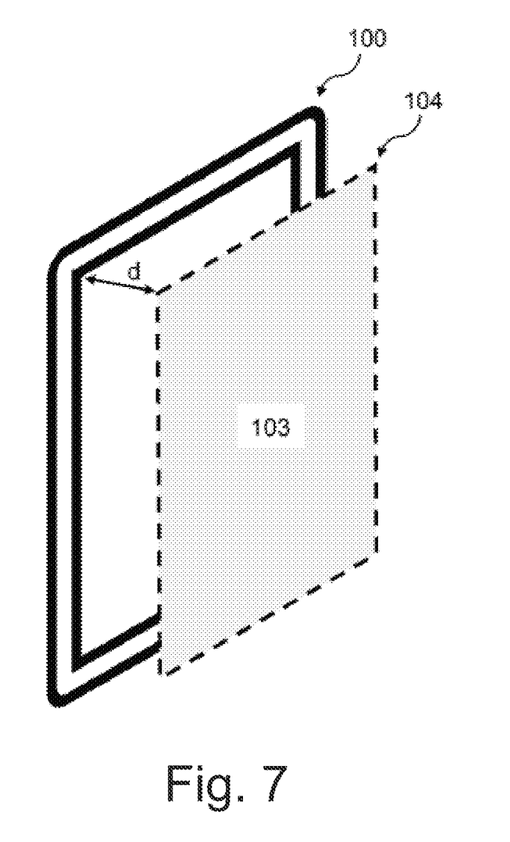
FIG. 7: A schematic illustration of an input area for gesture control according to embodiments of the present invention.

FIG. 7 illustrates the step of defining a touchless gesture control input area 103 for the electronic display screen 100 being observable by the at least one depth camera 101. For enabling gesture input, the input area 103 may include or be equal to a virtual screen layer 104 which is defined to extend distanced by a predetermined distanced parallel to the electronic display screen 100. In other words, the input area 103 may be a spatial area which is e.g. parallel to the screen layer and which is observed by the at least one depth camera 101 to recognize gesture inputs of users. Thus, it may be provided that determining a touchless gesture control input area 103 comprises a definition of a virtual screen layer 104 being essentially parallel to the electronic display screen 100, preferably at a distance d.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, such as a processor, a microprocessor, a programmable computer or an electronic circuit. Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments of the invention provide a data carrier having electronically readable control signals, which are capable of cooperating with a programmable computer system, such that one of the methods described herein is performed.

Generally, embodiments of the invention can be implemented as a computer program (product) with a program code, the program code being operative for performing one of the methods when the computer program product runs on a computer. The program code may, for example, be stored on a machine-readable carrier. Other embodiments comprise the computer program for performing one of the methods described herein, stored on a machine-readable carrier. In other words, an embodiment of the present invention is, therefore, a computer program having a program code for performing one of the methods described herein, when the computer program runs on a computer.

A further embodiment of the invention provides a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention provides a data stream or a sequence of signals representing the computer program for performing one of the methods described herein. The data stream or the sequence of signals may, for example, be configured to be transferred via a data communication connection, for example, via the internet.

A further embodiment of the invention provides a processing means, for example, a computer or a programmable logic device, configured to, or adapted to, perform one of the methods described herein.

A further embodiment of the invention provides a computer having installed thereon the computer program for performing one of the methods described herein.

A further embodiment of the invention provides an apparatus or a system configured to transfer (e.g., electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The below Reference Signs are provided herein by way of non-limiting example.

REFERENCE SIGNS 100 electronic display screen
101 depth camera 102 calibration pattern
103 input area
104 virtual screen layer
d distance
200 calibration device
201 footing section
202 mirror holding section
203 reflection
204 reference marking

ASPECTS OF THE PRESENT DISCLOSURE

The following aspects of the disclosure are exemplary only and not intended to limit the scope of the disclosure.

1. A computer-implemented method of calibrating an electronic display screen (100) for touchless gesture control using a calibration device (200), wherein the method comprises:
   displaying, by the electronic display screen (100), a calibration pattern (102);
   detecting, using at least one depth camera (101), a calibration device (200) being placed on the electronic display screen (100) and a reflection (203) of at least a part of the calibration pattern (102), wherein the reflection (203) is provided by a reflective surface of the calibration device (200);
   determining, based on the detected reflection (203), the position of the calibration device (200) with respect to the displayed calibration pattern (102) on the electronic display screen (100); and
   defining a touchless gesture control input area (103) for the electronic display screen (100) being observable by the at least one depth camera (101).

2. The method of aspect 1, wherein the calibration pattern (102) consists of adjacent pattern sections, wherein respective adjacent pattern sections are distinguishable from each other; and
   wherein, preferably, each pattern section of the calibration pattern (102) is unique.

3. The method of aspect 1 or 2, comprising, prior to defining the touchless gesture control input area (103):
   determining borders of the electronic display screen (100) based at least on the detected reflection (203), a digital representation of the calibration pattern (102) being preserved in a data storage, and screen dimension information with respect to the electronic display screen (100).

4. The method of aspect 3, wherein the screen dimension information with respect to the electronic display screen (100) is received via user input and/or is determined automatically based on a resolution of the electronic display screen (100) and based on a pixel density electronic display screen (100).

5. The method of any one of the preceding aspects, wherein the calibration pattern (102) is a fiducial marker, preferably an AprilTag and/or a QR-Code.

6. The method of any one of the preceding aspects, further comprising:
   detecting, using the at least one depth camera (101), a reference marking (204) of the calibration device (200), the reference marking (204) preferably being provided at corners and/or edges of the reflective surface.

7. The method of any one of preceding aspects, wherein at least the steps of detecting the calibration device (200), determining the position of the calibration device (200), and defining the touchless gesture control input area (103) are triggered upon receiving a user input or upon automatically detecting that the calibration device (200) positioned on the electronic display screen (100);
   wherein, optionally, detecting that the calibration device (200) is positioned on the electronic display screen (100) includes detecting a calibration triggering mark of the calibration device (200), wherein the calibration triggering mark may be an acoustic mark and/or visual mark.

8. The method of any one of the preceding aspects, wherein determining borders of the electronic display screen (100) comprises at least one base transformation operation of a coordinate system.

9. The method of any one of the preceding aspects, wherein determining borders of the electronic display screen (100) comprises:
   determining, using the at least one depth camera (101), a center of the reflection in 3D and defining a coordinate system, wherein the center of the reflection is the origin of the coordinate system; and
   shifting the origin of the coordinate system orthogonal to the screen surface of the electronic display screen (100) so that the origin of the coordinate system is in the plane of the screen surface of the electronic display screen (100).

10. The method of any one of the preceding aspects, wherein detecting the reflection (203) is performed using two depth cameras (101).

11. The method of any one of the preceding aspects, wherein determining a touchless gesture control input area (103) comprises a definition of a virtual screen layer (104) being essentially parallel to the electronic display screen (100), preferably at a distance (d).

12. The method of any one of the preceding aspects, comprising outputting a signal upon starting, successfully ending, aborting, and/or failing the calibration of the electronic display screen (100).

13. A calibration device (200), preferably for use in the method according to any one of aspects 1 to 12, for calibrating an electronic display screen (100), comprising:
    a footing section (201) for placing the calibration device (200) on the electronic display screen (100);
    at least one mirror holding section (202), wherein the mirror holding section (202) holds a reflective surface, preferably a mirror, at a predetermined angle with respect to the electronic display screen (100) when the calibration device (200) is positioned on the electronic display screen (100), wherein the reflective surface is preferably a first-surface mirror; and
    optionally, at least one reference marking (204) on the reflective surface and/or the mirror holding section (202) and/or the footing section (201).

14. A data processing apparatus comprising means for carrying out the method of any one of aspects 1 to 12.

15. A computer program comprising instructions which, when the program is executed by a computer, cause the computer to carry out the method of any one of aspects 1 to 12.

The invention claimed is:

1. A computer-implemented method of calibrating an electronic display screen for touchless gesture control using a calibration device, wherein the computer-implemented method comprises:

displaying, by the electronic display screen, a calibration pattern;

detecting, using at least one depth camera, a calibration device being placed on the electronic display screen and a reflection of at least a part of the calibration pattern, wherein the reflection is provided by a reflective surface of the calibration device;

determining, based on the detected reflection, the position of the calibration device with respect to the displayed calibration pattern on the electronic display screen; and defining a touchless gesture control input area for the electronic display screen being observable by the at least one depth camera.

2. The computer-implemented method of claim 1, wherein the calibration pattern consists of adjacent pattern sections, wherein respective adjacent pattern sections are distinguishable from each other.

3. The computer-implemented method of claim 1, comprising, prior to defining the touchless gesture control input area:

determining borders of the electronic display screen based at least on the detected reflection, a digital representation of the calibration pattern being preserved in a data storage, and screen dimension information with respect to the electronic display screen.

4. The computer-implemented method of claim 3, wherein the screen dimension information with respect to the electronic display screen is received via user input and/or is determined automatically based on a resolution of the electronic display screen and based on a pixel density electronic display screen.

5. The computer-implemented method of claim 1, wherein the calibration pattern is a fiducial marker.

6. The computer-implemented method of claim 1, further comprising:

detecting, using the at least one depth camera, a reference marking of the calibration device.

7. The computer-implemented method of claim 1, wherein at least the steps of detecting the calibration device, determining the position of the calibration device, and defining the touchless gesture control input area are triggered upon receiving a user input or upon automatically detecting that the calibration device positioned on the electronic display screen.

8. The computer-implemented method of claim 1, wherein determining borders of the electronic display screen comprises at least one base transformation operation of a coordinate system.

9. The computer-implemented method of claim 1, wherein determining borders of the electronic display screen comprises:

determining, using the at least one depth camera, a center of the reflection in 3D and defining a coordinate system, wherein the center of the reflection is the origin of the coordinate system; and shifting the origin of the coordinate system orthogonal to the screen surface of the electronic display screen so that the origin of the coordinate system is in the plane of the screen surface of the electronic display screen.

10. The computer-implemented method of claim 1, wherein detecting the reflection is performed using two depth cameras.

11. The computer-implemented method of claim 1, wherein determining a touchless gesture control input area comprises a definition of a virtual screen layer being essentially parallel to the electronic display screen.

12. The computer-implemented method of claim 1, comprising outputting a signal upon starting, successfully ending, aborting, and/or failing the calibration of the electronic display screen.

13. The computer-implemented method of claim 2, wherein each pattern section of the calibration pattern is unique.

14. The computer-implemented method of claim 5, wherein the fiducial marker is an AprilTag and/or a QR-Code.

15. The computer-implemented method of claim 6, wherein the reference marking is provided at corners and/or edges of the reflective surface.

16. The computer-implemented method of claim 7, wherein detecting that the calibration device is positioned on the electronic display screen includes detecting a calibration triggering mark of the calibration device, wherein the calibration triggering mark may be an acoustic mark and/or visual mark.

17. The computer-implemented method of claim 11, wherein the definition of a virtual screen layer is at a distance (d) from the electronic display screen.

18. A data processing apparatus configured to calibrate an electronic display screen for touchless gesture control using a calibration device, the data processing apparatus comprising:

a processor;

a memory communicatively connected to the processor; and computing instructions stored in the memory, that when executed by the processor, causes the processor to:

display, by the electronic display screen, a calibration pattern;

detect, using at least one depth camera, the calibration device being placed on the electronic display screen and a reflection of at least a part of the calibration pattern, wherein the reflection is provided by a reflective surface of the calibration device;

determine, based on the detected reflection, the position of the calibration device with respect to the displayed calibration pattern on the electronic display screen; and define a touchless gesture control input area for the electronic display screen being observable by the at least one depth camera.

19. The data processing apparatus of claim 18, wherein the calibration device comprises:

a footing section for placing the calibration device on the electronic display screen; and at least one mirror holding section, wherein the mirror holding section holds a reflective surface at a predetermined angle with respect to the electronic display screen when the calibration device is positioned on the electronic display screen.

20. A tangible, non-transitory computer-readable medium storing instructions for calibrating an electronic display screen for touchless gesture control, the computing instructions when executed by a computing device, cause the computing device to:

display, by the electronic display screen, a calibration pattern;

detect, using at least one depth camera, a calibration device being placed on the electronic display screen and a reflection of at least a part of the calibration pattern, wherein the reflection is provided by a reflective surface of the calibration device;

determine, based on the detected reflection, the position of the calibration device with respect to the displayed calibration pattern on the electronic display screen; and define a touchless gesture control input area for the electronic display screen being observable by the at least one depth camera.

\* \* \* \* \*